United States Patent
Yano

[11] Patent Number: 6,046,853
[45] Date of Patent: Apr. 4, 2000

[54] OPTICAL SYSTEM FOR OBSERVING EQUIPMENT HAVING IMAGE VIBRATION COMPENSATION SYSTEM

[75] Inventor: Takaaki Yano, Hokkaido, Japan

[73] Assignee: Asahi Kogaku Kogyo Kabushiki Kaisha, Tokyo, Japan

[21] Appl. No.: 09/222,914

[22] Filed: Dec. 30, 1998

[30] Foreign Application Priority Data

Jan. 6, 1998 [JP] Japan .................. 10-001174

[51] Int. Cl.⁷ .......................... G02B 27/64; G02B 23/00
[52] U.S. Cl. .......................... 359/557; 359/407; 359/554
[58] Field of Search .................. 359/554–557, 359/420–422, 431–433, 689–692, 784–785, 793–794, 676–678, 399, 744, 405–409, 480–482; 396/52–55, 373–386; 348/208

[56] References Cited

U.S. PATENT DOCUMENTS

| 784,611 | 3/1905 | Aitchison | 359/431 |
|---|---|---|---|
| 5,020,892 | 6/1991 | Glover et al. | 359/399 |
| 5,461,513 | 10/1995 | Maruyama | 359/557 |
| 5,500,769 | 3/1996 | Betensky | 359/432 |
| 5,598,296 | 1/1997 | Imaizumi | 359/431 |
| 5,680,195 | 10/1997 | Pekar et al. | 359/407 |
| 5,754,339 | 5/1998 | Kanai et al. | 359/557 |

FOREIGN PATENT DOCUMENTS

| 60-76711 | 5/1985 | Japan | 359/431 |
|---|---|---|---|
| 6-43365 | 2/1994 | Japan . | |
| 6-308431 | 11/1994 | Japan . | |
| 10-20213 | 1/1998 | Japan . | |
| 10186228 | 7/1998 | Japan . | |

*Primary Examiner*—Thong Nguyen
*Attorney, Agent, or Firm*—Greenblum & Bernstein, P.L.C.

[57] ABSTRACT

An optical system for a binocular is provided with an objective optical system, an erecting system and an eyepiece. The objective optical system includes a first lens having positive refractive power, a second lens having negative refractive power and a third aspherical lens having positive refractive power. The first and second lenses are cemented to each other. The third lens is capable of moving in a direction orthogonal to an optical axis of the objective optical system. The objective optical system satisfies the following relationship:

$$-0.30 < \phi_c/\phi_{13} < 0$$

where, $\phi_c$ is a refractive power of the cemented surface of the first and second lenses, and $\phi_{13}$ is a composite power of the first, second, and third lenses.

5 Claims, 11 Drawing Sheets

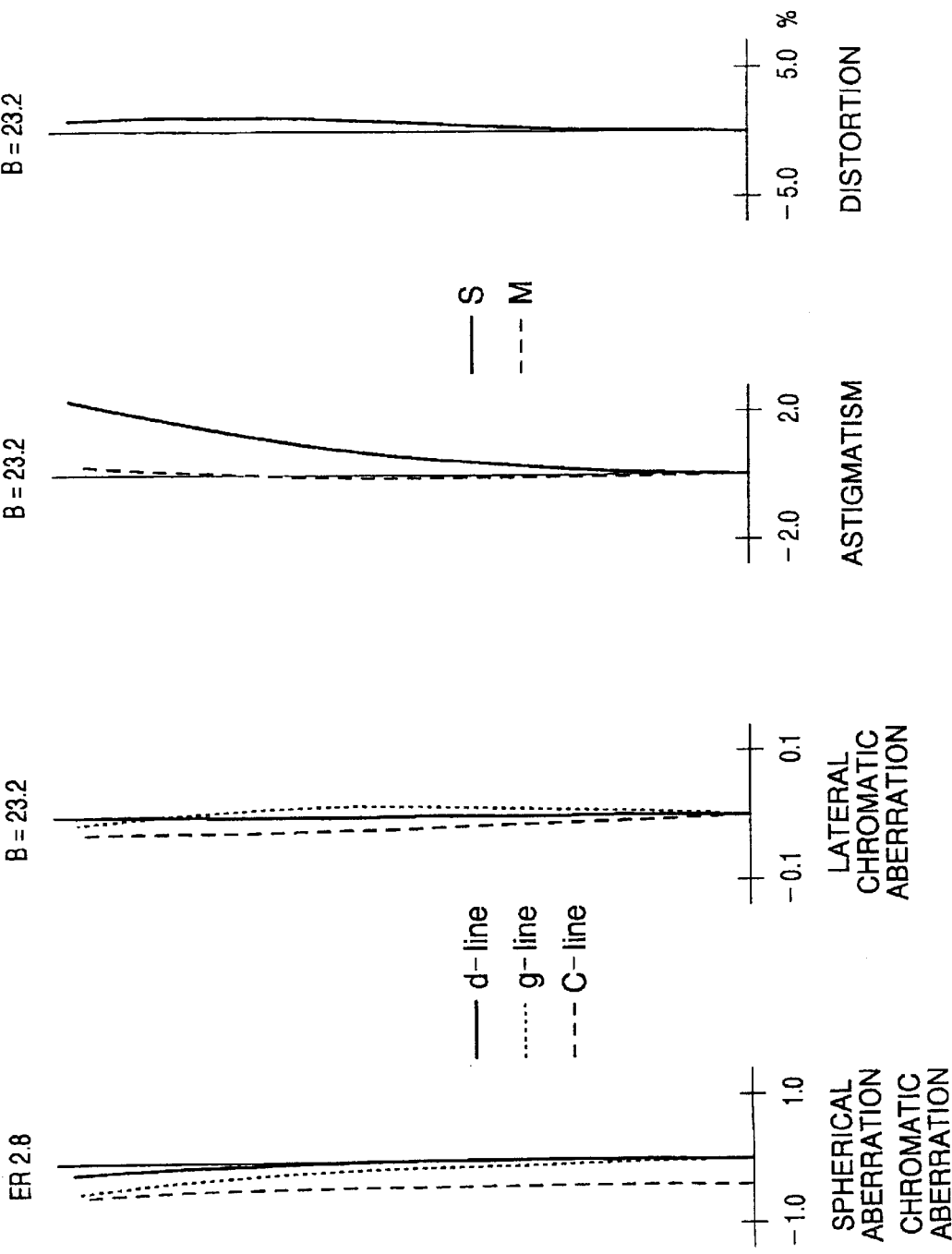

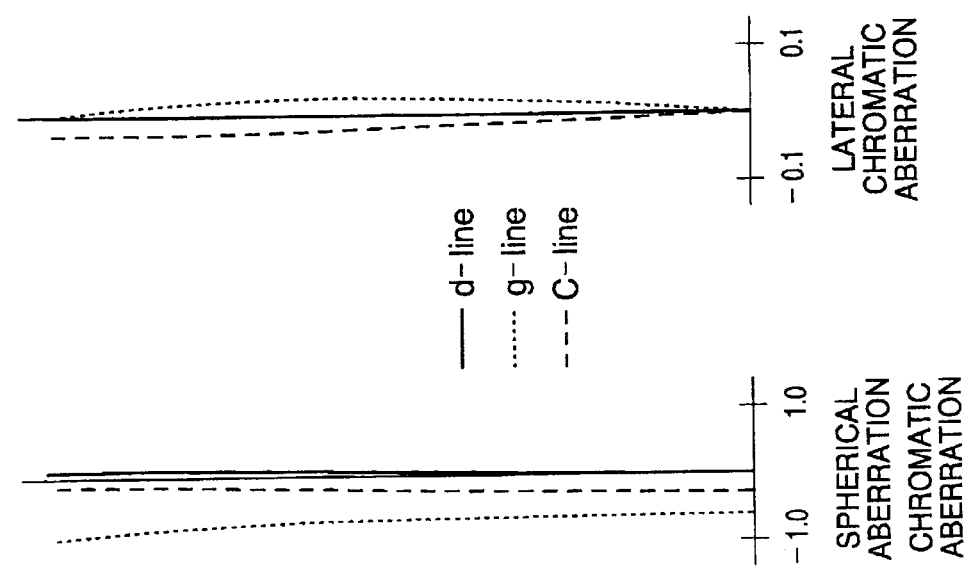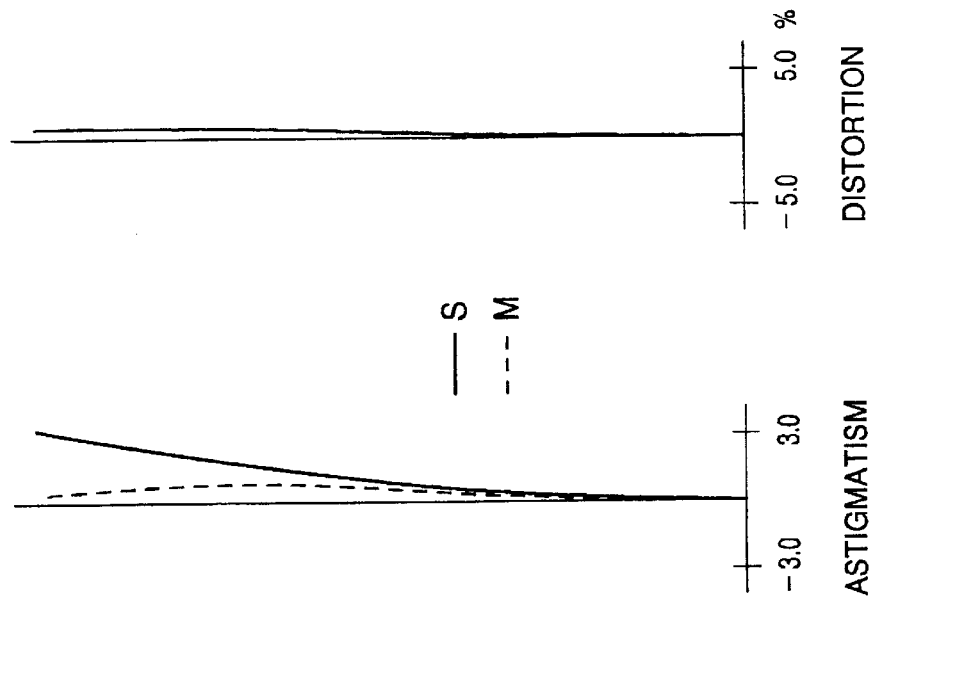

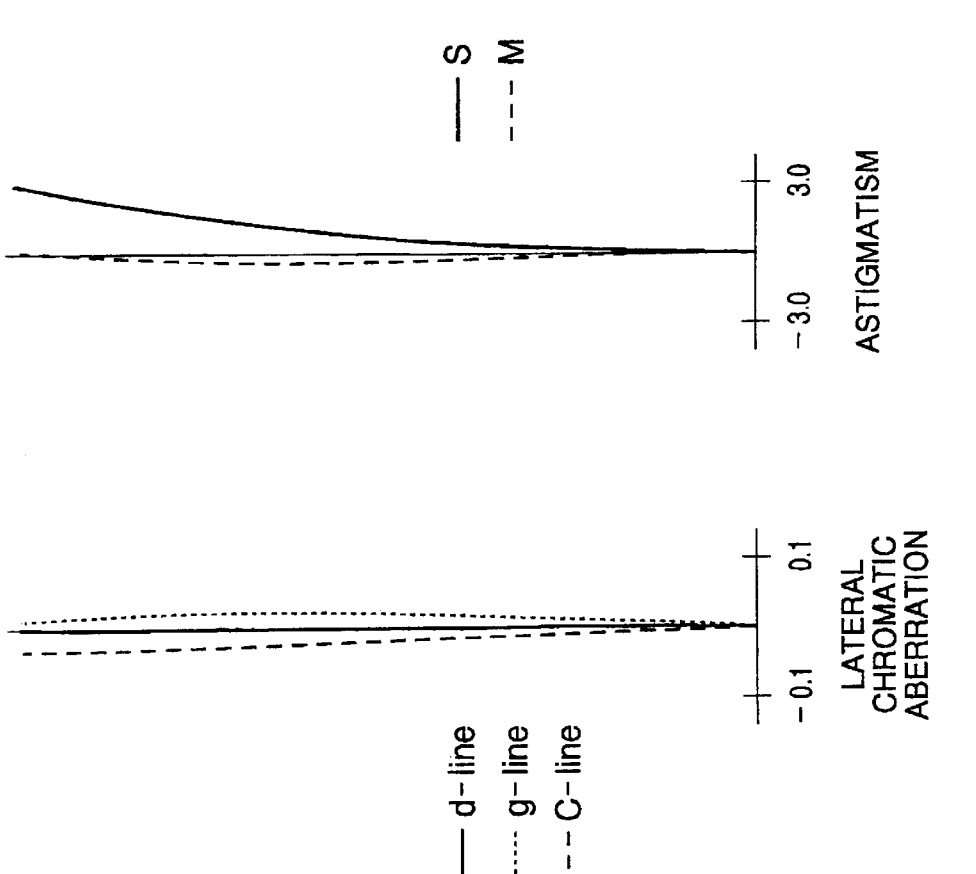

OPTICAL SYSTEM FOR OBSERVING EQUIPMENT HAVING IMAGE VIBRATION COMPENSATION SYSTEM

BACKGROUND OF THE INVENTION

The present invention relates to an optical system for an observing equipment such as a binocular or a terrestrial telescope that has an image vibration compensation system.

Recently, binoculars provided with image vibration compensation systems for preventing the vibration of an observed image due to hand-held shaking of a user have been developed. Japanese Laid Open Publication No. HEI 6-43365 discloses an image vibration compensation system of a binocular that employs a variable angle prism for each of telescopic optical systems of the binocular. FIG. 14 shows one example of the telescopic optical system that has the same arrangement of the optical components as the publication. The optical system includes an objective lens 1 that is a doublet, a variable angle prism 2 as a compensation element, an erecting system 3 and an eyepiece 4. When the optical system vibrates due to hand-held shaking of a user, the vertex angle of the variable angle prism 2 is controlled to stabilize the image.

In such a construction, however, since the variable angle prism 2 is located in the convergent light, if the vertex angle of the prism is changed, coma results. FIG. 15A shows the axial coma when the vertex angle of the variable angle prism 2 has not yet changed. FIG. 15B shows the axial coma when the variable angle prism 2 is changed in order to compensate the inclination of the optical system which was inclined by 1 degree. As shown in FIGS. 15A and 15B, the coma has been increased significantly when the vertex angle has been changed. Accordingly, the image viewed by a user is deteriorated due to the coma when the vertex angle of the variable angle prism 2 has been changed to compensate the vibration of the image.

Another example of the image vibration compensation system for binoculars is disclosed in Japanese Laid Open Publication No. HEI 6-308431. The binocular in this publication employs a compensation device that is attached in front of the objective lenses of the binocular. Since the objective lens of the telescopic optical system has the largest diameter in the system, and the device is arranged in front of the objective lenses, the entire system becomes large in size.

SUMMARY OF THE INVENTION

It is therefore an object of the present invention to provide an optical system of an observing equipment having an image vibration compensation system, which is compact in size, and can be manufactured easily.

For the above object, according to the present invention, there is provided an optical system of an observing equipment having an image vibration compensation system. The optical system includes:

an objective optical system for forming an image of an object, the objective optical system including a first lens having positive refractive power, a second lens having negative refractive power and a third lens having positive refractive power, the third lens having at least one aspherical surface, the first, second and third lenses being arranged in that order from an object side, the first and second lenses being cemented to each other, the third lens being movable in a direction orthogonal to an optical axis of the objective optical system;

an erecting system for erecting the image formed by the objective optical system; and an observing optical system for observing the image erected by the erecting system, $$-0.30 < \phi_c/\phi_{13} < 0, \quad (1)$$

where, $\phi_c$ is a refractive power of the cemented surface of the first and second lenses, and $\phi_{13}$ is a composite power of the first, second and third lenses of the objective optical system.

With this construction, vibration of an image due to the hand-held shaking is compensated by the third lens (i.e., a compensation element). The third lens has at least one aspherical surface, and spherical aberration of the third lens can be well suppressed. Accordingly, in the optical system, coma can be well suppressed even when the element (i.e., the third lens) is moved to stabilize a position of an image. Further, the compensation element is a part of the objective optical system located at the image side in the objective optical system, the size of the compensation element becomes smaller than the conventional element which is located at the object side of the objective optical system.

Still further, since the positive first lens and the negative second lens are cemented to each other, an effect of decentering or inclination of the positive lens can be counterbalanced with the same decentering or inclination of the negative lens. As a result, sensitivity of decentering and/or sensitivity of inclination of the first and second lenses become smaller than in an optical system where positive and negative lenses are separated.

In the specific embodiment, at least one of the following conditions is satisfied.

$$|\phi_{12}/\phi_{13}| < 0.4, \quad (2)$$
$$1.0 < h_f/h_x < 1.4, \quad (3)$$

where, $\phi_{12}$ is a composite power of the first and second lenses,
$\phi_{13}$ is a composite power of the first, second and third lenses,
$h_f(\neq 0)$ is a height of a point where a paraxial axial ray intersects the object side surface of the first lens, and
$h_x$ is a height of a point where the paraxial axial ray intersects the image side surface of the second lens.

In the specification and claims, "the paraxial axial ray" is defined as a ray from an object point on an optical axis at infinity.

Further, it is relatively easy to form the aspherical surface on the plastic lens.

DESCRIPTION OF THE ACCOMPANYING DRAWINGS

Figure 1:
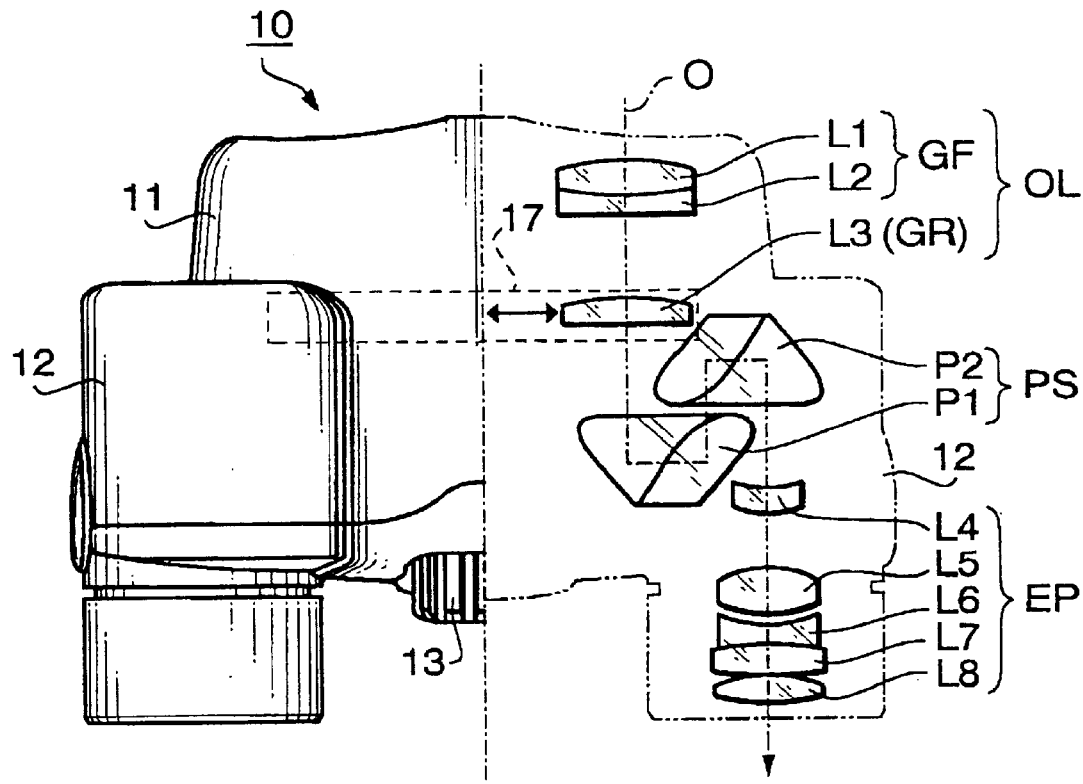
FIG. 1 is a plane view of a binocular that employs an optical system of the present invention with showing one of two telescopic optical systems.
Figure 3:
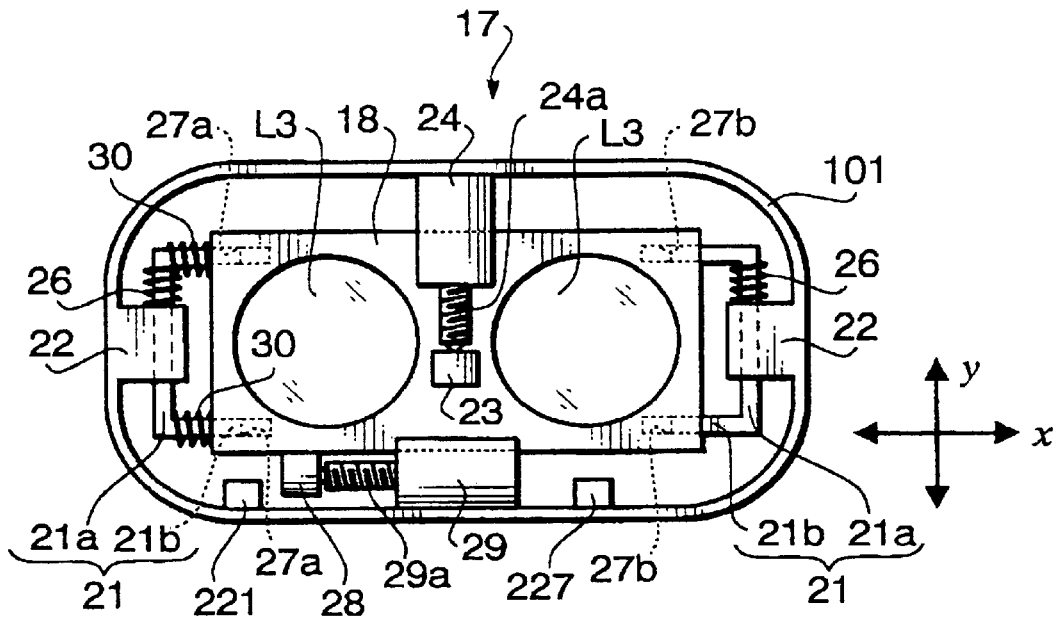
Figure 4:
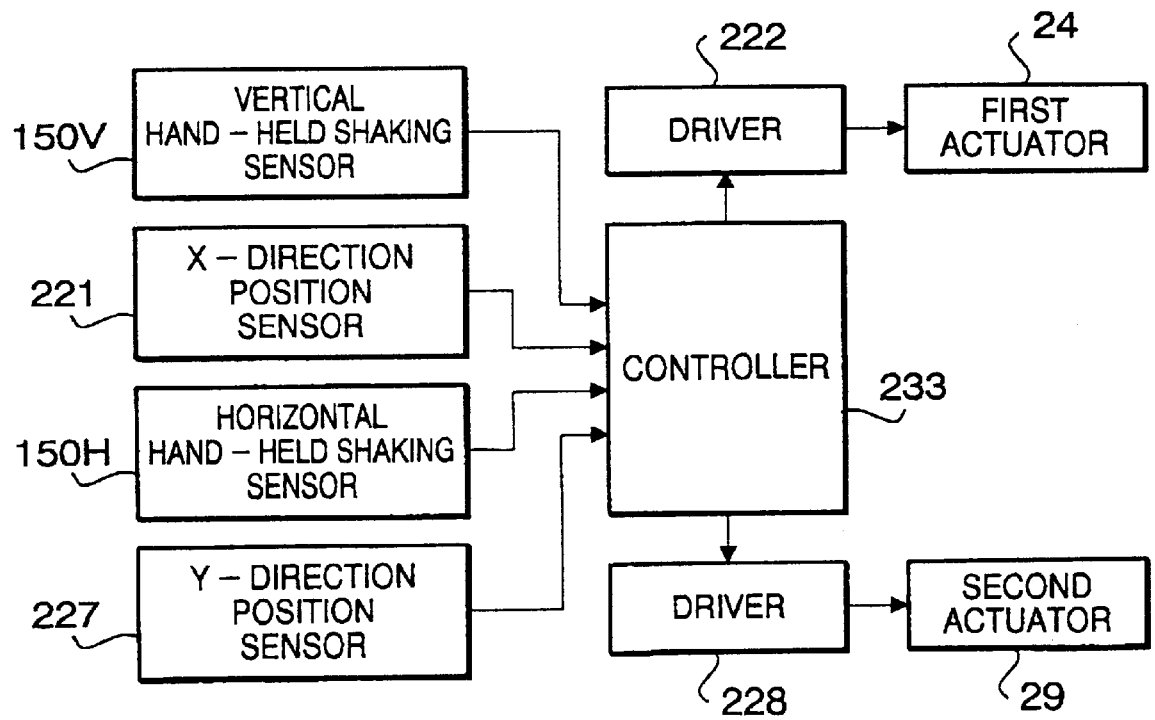
Figure 5:
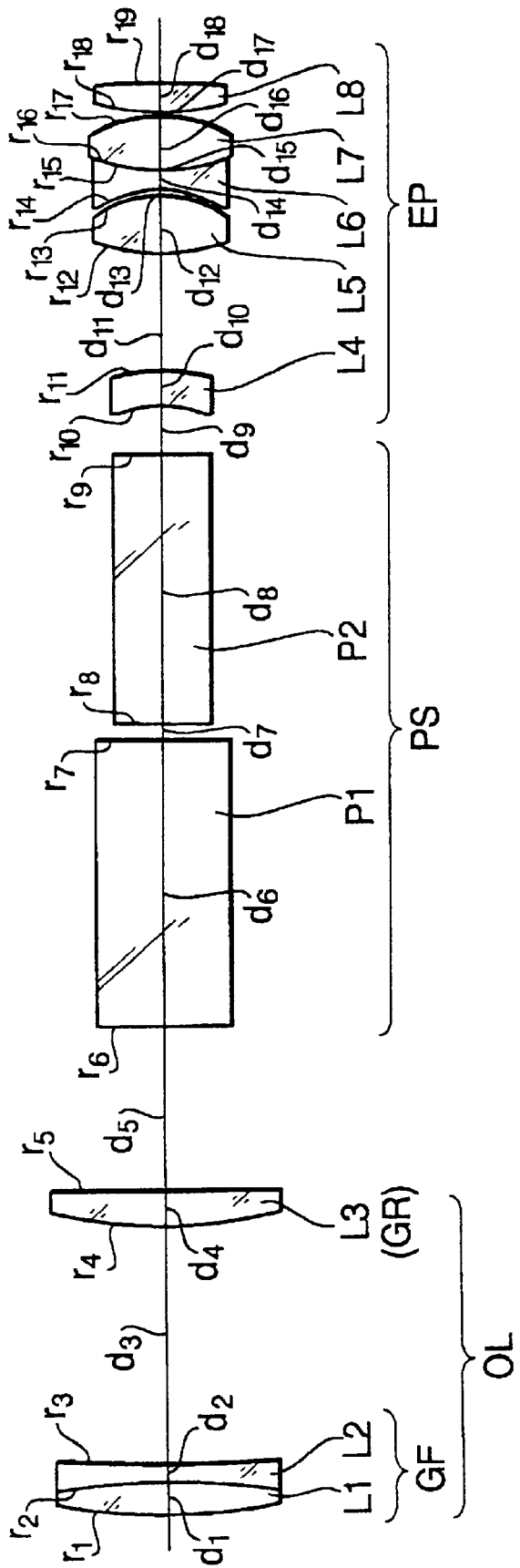
Figure 7A:
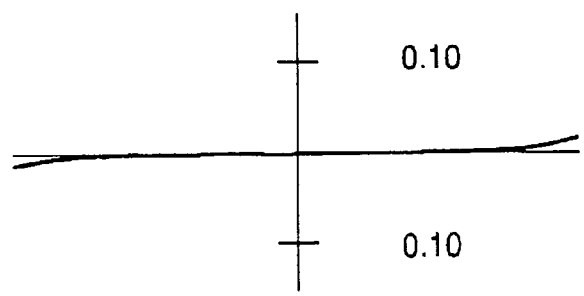
Figure 7B:
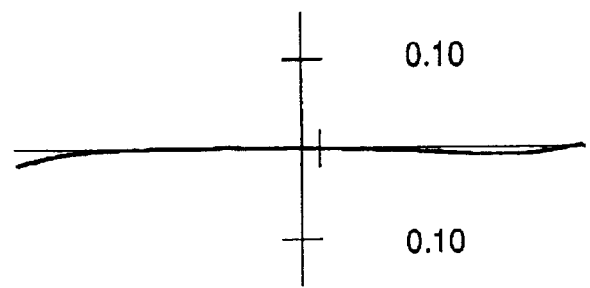
Figure 10A:
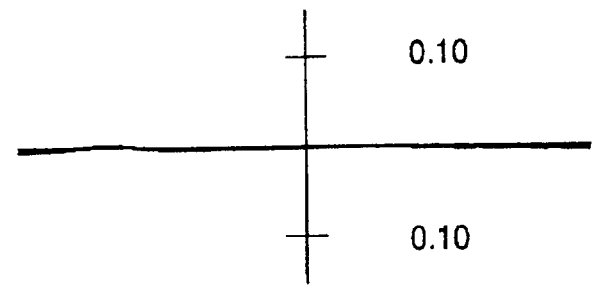
Figure 10B:
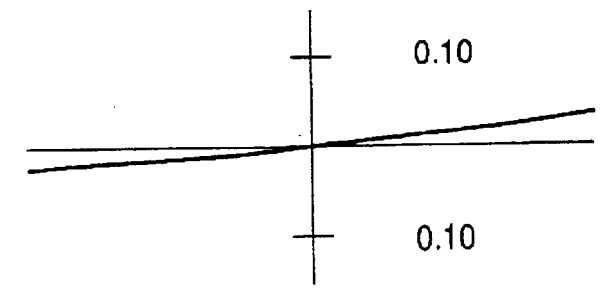
Figure 8:
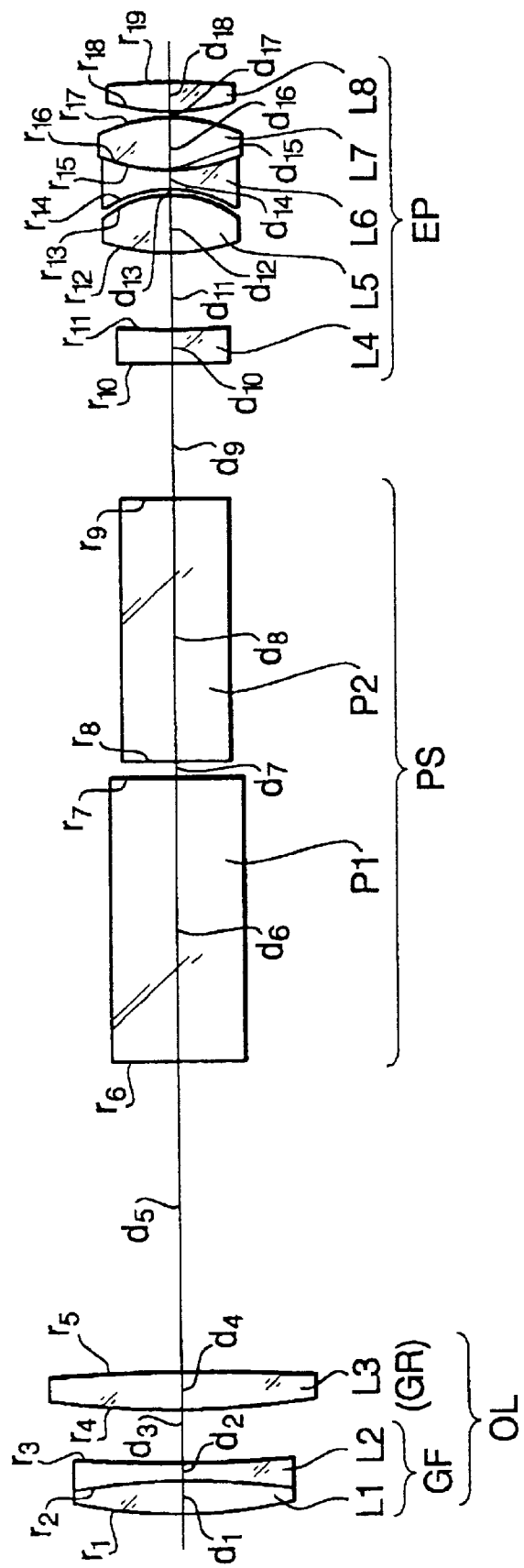
Figure 11:
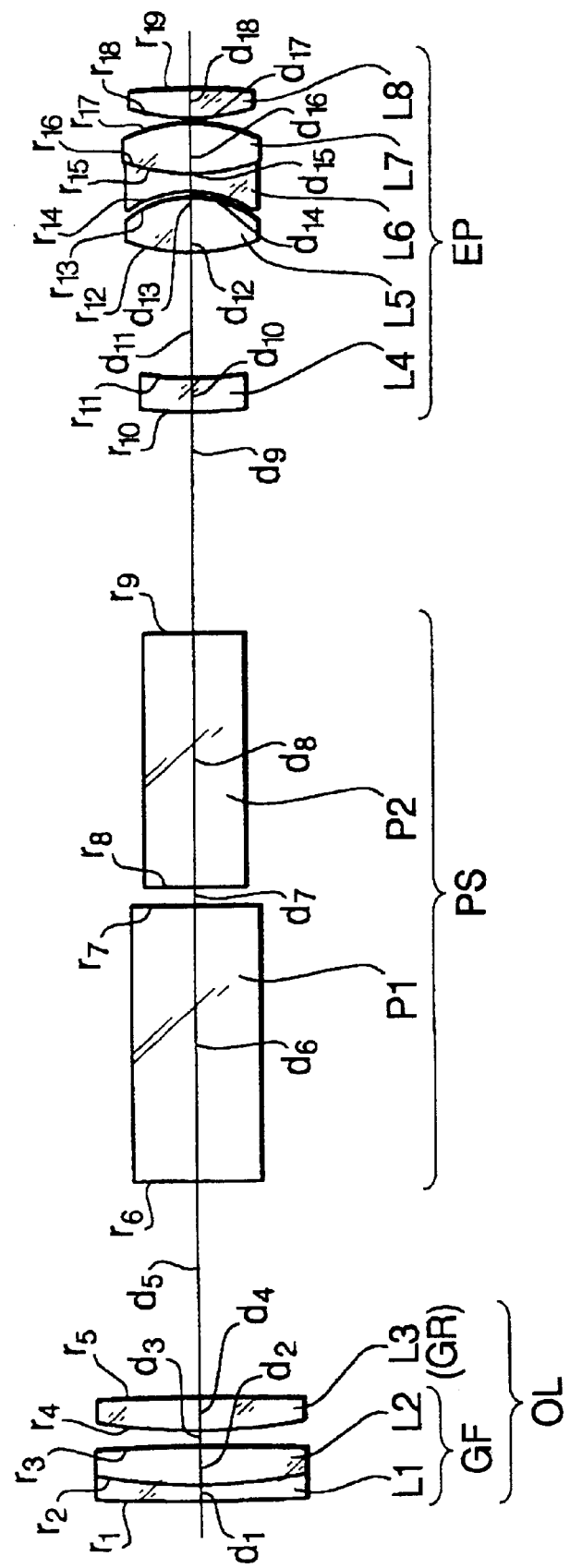
Figure 13A:
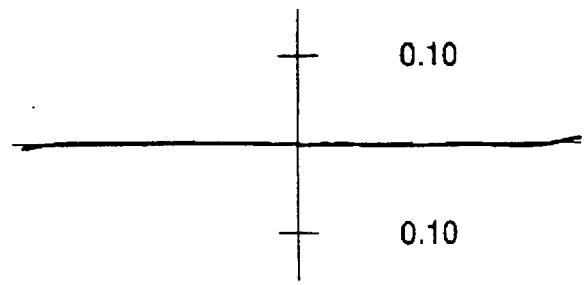
Figure 13B:
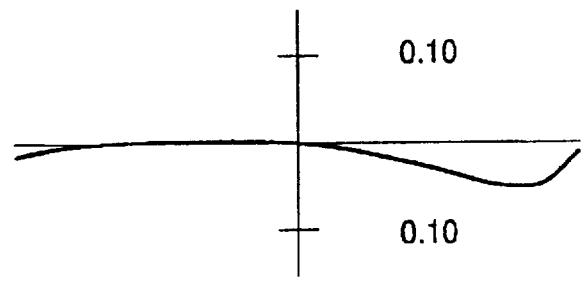
Figure 15A:
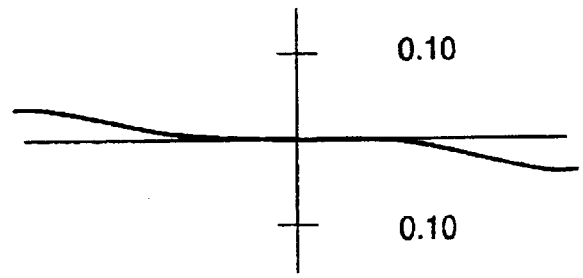
Figure 15B:
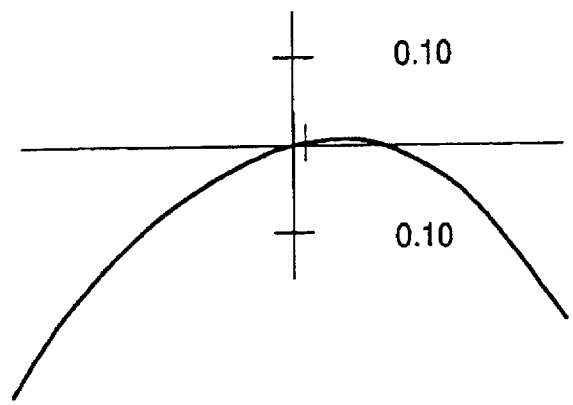
Figure 14:
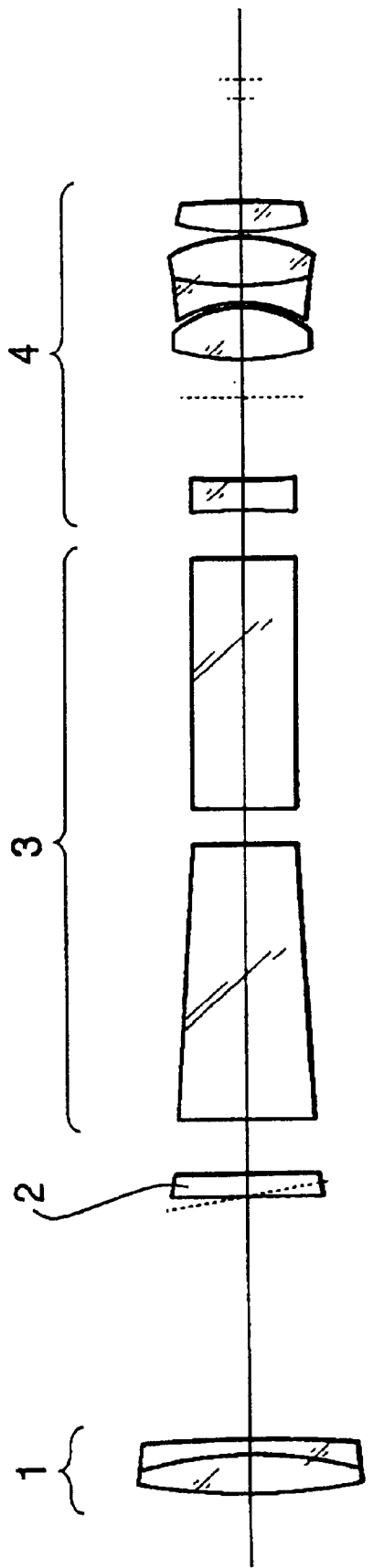

FIG. 3 schematically shows a structure of the driving mechanism shown in FIG. 1;

FIG. 4 is a block diagram illustrating a control system for controlling the driving mechanism;

FIG. 5 is a lens diagram showing a telescopic optical system according to a first embodiment;

FIGS. 6A through 6D show various aberrations of the telescopic optical system shown in FIG. 5;

FIG. 7A shows axial coma of the telescopic optical system shown in FIG. 5 when the third lens is not decentered;

FIG. 7B shows axial coma of the telescopic optical system shown in FIG. 5 when the third lens is decentered to stabilize an image when a tilt angle is 1 degree;

FIG. 8 is a lens diagram showing a telescopic optical system according to a second embodiment;

FIGS. 9A through 9D show various aberrations of the telescopic optical system shown in FIG. 8;

FIG. 10A shows axial coma of the telescopic optical system shown in FIG. 8 when the third lens is not decentered;

FIG. 10B shows axial coma of the optical system shown in FIG. 8 when the third lens is decentered to stabilize an image when the tilt angle is 1 degree;

FIG. 11 is a lens diagram showing a telescopic optical system according to a third embodiment;

FIGS. 12A through 12D show various aberrations of the telescopic optical system shown in FIG. 11;

FIG. 13A shows axial coma of the telescopic optical system shown in FIG. 11 when the third lens is not decentered;

FIG. 13B shows axial coma of the optical system shown in FIG. 11 when the third lens is decentered to stabilize an image when the tilt angle is 1 degree;

FIG. 14 is a lens diagram showing a conventional telescopic optical system of a binocular;

FIG. 15A shows axial coma of the telescopic optical system shown in FIG. 14 when the vertex of a variable prism is not changed; and FIG. 15B shows axial coma of the optical system shown in FIG. 14 when the variable prism is angled to stabilize an image when the tilt angle is 1 degree.

DESCRIPTION OF THE EMBODIMENTS

Figure 2:
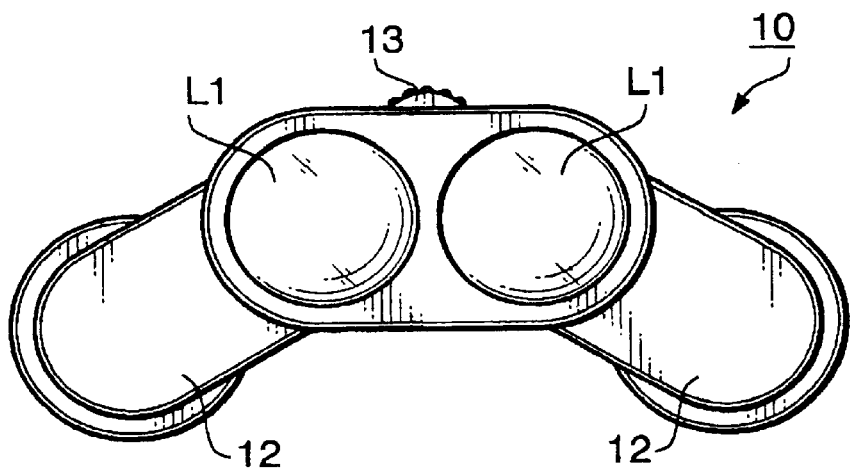
FIG. 2 is a front view of the binocular shown in FIG. 1.

FIG. 1 shows a binocular 10 that employs a pair of telescopic optical'systems. The binocular 10 employs an image vibration compensation system. FIG. 2 shows a front view of the binocular 10. The binocular 10 includes a center body 11 and a pair of grip portions 12 that are connected to the center body 11 at right and left sides thereof, respectively. The grip portions 12 are rotatable with respect to the center body 11 in order to adjust a distance therebetween to fit a pupil distance of a user. A diopter adjusting dial 13 is attached to a rear portion (i.e., the lower portion in FIG. 1) of the center body 11.

The binocular 10 is provided with right and left telescopic optical systems arranged side by side for right and left eyes of the user. Since the left telescopic optical system is symmetric to the right telescopic optical system, FIG. 1 shows elements included in the right telescopic optical system, and description is directed therefor.

The telescopic optical system consists of an objective optical system OL for forming an image of an object, an erecting system PS for erecting the image, and an eyepiece EP as an observing optical system.

The objective optical system OL, which is provided in the center body 11, includes: a first lens L1 having positive refractive power; a second lens L2 having negative refractive power; and an aspherical third lens L3 having positive refractive power. The first to third lenses L1, L2 and L3 are arranged in this order from an object side. The first lens L1 and the second lens L2 are cemented with each other to form a front lens group GF. The third lens L3 forms a rear lens group GR. It should be noted that at least one surface of the third lens L3 is formed to be an aspherical surface. The third lens L3 is a plastic lens, and in a first embodiment described later, an image side surface is formed as an aspherical surface; this is also true of the second and third embodiments, as well. The third lens L3 is mounted on a driving mechanism 17 that moves the third lens L3 in a direction orthogonal to an optical axis O of the objective optical system OL.

The objective optical system OL forms an inverted image, and the inverted image is erected into proper orientation through the erecting system PS. The erecting system PS is provided with a first prism P1 and a second prism P2, which constitute type II Porro prism system. The first prism P1 has two reflection surfaces for rotating the image by 90 degrees, and the second prism PS2 also has two reflection surfaces for further rotating the image by 90 degrees.

The eyepiece EP has fourth through eighth lenses L4 through L8. The objective optical system OL and the first prism P1 is arranged in the center body 11, and the second prism P2 and the eyepiece EP are arranged in the grip portion 12.

The grip portion 12 is rotatable, with respect to the center body 11, about the optical axis O of the objective optical system OL. The erecting system PS and the eyepiece EP are rotated together with the grip portion 12. The left and right grip portions rotate in the opposite directions, and the user can adjust the distance between the left and right eyepieces to correspond to the pupil distance of the user.

In this specification, an x-axis direction and a y-axis direction are defined with respect to the binocular 10. The y-axis direction is defined as a direction which is orthogonal to a plane including the optical axes O of both the right and left telescopic optical systems. The x-axis direction is defined as a direction, which is parallel to a line on a plane orthogonal to the optical axis O, and is orthogonal to the y-axis direction. Thus, the x-axis and y-axis are orthogonal to each other, and both are orthogonal to the optical axis O.

The driving mechanism 17 drives the third lens L3 in the x-axis and y-axis directions such that the image viewed by a user is stabilized even when a hand-held shaking is applied to the binocular.

At the initial or neutral positions of the third lens L3, the optical axis of the third lens L3 is coincident with the optical axis O of the first and second lenses L1 and L2.

When the object side of the binocular 10 moves, relatively to the eyepiece side, in the y-axis direction due to a hand-held shaking, the driving mechanism 17 moves the third lens in the y-axis direction so that a position of an image is maintained. Similarly, when the object side of the binocular 10 moves, relatively to the eyepiece side, in the x-axis direction due to the hand-held shaking, the driving mechanism 17 moves the third lens in the x-axis direction so that the image position is maintained. In this specification, the angle formed between the optical axes O before and after the binocular 10 has been moved in the y-axis direction is referred to as a tilt angle in the y-axis direction, and the angle formed between the optical axes O before and after the binocular 10 has been moved in the x-axis direction is referred to as a tilt angle in the x-axis direction. It should be noted that the hand-held shaking applied to the binocular 10 can be represented by the tilt angle(s) in the x-axis and/or y-axis directions, and accordingly, the image can be stabilized due to the hand-held shaking and thus compensated by moving the third lens in the x-axis and/or y-axis direction.

FIG. 3 shows an example of the driving mechanism 17 for driving the third lens L3.

The driving mechanism 17 includes a rectangular lens frame 18 that holds the third lenses L3 of both the telescopic optical systems at openings formed thereon, a first actuator 24 for linearly shifting the rectangular lens frame 18 in the y-axis direction and a second actuator 29 for linearly shifting the frame 18 in the x-axis direction.

At longitudinal side ends of the lens frame 18, a pair of guide bars 21 and 21 are provided. The guide bar 21 has a center bar 21a and edge bars 21b formed at both edges of the center bar 21a. Both of the edge bars 21b are perpendicular to the center bar 21a and are directed to the same direction. The guide bars 21 and 21 are arranged such that the center bars 21a and 21a are parallel to the y-axis and that the tip ends of the edge bars 21b and 21b are faced to the rectangular lens frame 18.

The center bars 21a and 21a of the guide bars 21 and 21 are slidably fitted in through-holes formed in a pair of supports 22 and 22 that are formed inside the body 101 of the binocular.

The tip ends of the edge bars 21b of the one guide bars 21 are slidably inserted into holes 27a and 27a formed at one side end of the rectangular lens frame 18. The tip ends of the edge bars 21b of the other guide bars 21 are slidably inserted into holes 27b and 27b formed at the opposite side end of the rectangular lens frame 18.

With this structure, the lens frame 18 is movable in the y-axis direction and in the x-axis direction.

The first and second actuator 24 and 29 are secured on the inner surface of the body 101 of the binocular. A plunger 24a of the first actuator 24 is capable of protruding/retracting in the y-axis direction. The plunger 24a abuts a projection 23 formed on the lens frame 18 between the pair of third lenses L3. Further, coil springs 26 and 26 are provided to the center bars 21a and 21a to bias the lens frame 18 in the upward direction in FIG. 3 with respect to the body 101 of the binocular.

A plunger 29a of the second actuator 29 is capable of protruding/retracting in the x-axis direction. The plunger 29a abuts a projection 28 formed on the side of the lens frame 18. The coil springs 30 and 30 are provided to the edge bars 21b and 21b of the one guide bar 21 to bias the lens frame 18 in the rightward direction in FIG. 3.

When electrical power is applied to the first actuator 24 to make the plunger 24a protrude, the plunger 24a pushes the projection 23 to linearly move the rectangular lens frame 18 in the downward direction in FIG. 3. When the electrical power for retracting the plunger 24a is applied to the actuator 24, due to force of the coil springs 26, the projection 23 is kept contacting the plunger 24a, i.e., the lens frame 18 moves in the upward direction in FIG. 3.

In the same manner, when the electrical power is applied to the second actuator 29 to make the plunger 29a protrude, the projection 28 is pushed to linearly move the rectangular lens frame 18 in the leftward direction in FIG. 3. When the electrical power for retracting the plunger 29a is applied, the lens frame 18 moves in the rightward direction due to the force of the coil springs 30 and 30.

When the third lens L3 is moved in the y-axis direction, the image in the user view moves in the vertical (up/down) direction. Accordingly, by controlling the first actuator 24, the vertical movement of the image due to the vertical hand-held shaking can be compensated, and by controlling the second actuator 29, the horizontal movement of the image due to the horizontal hand-held shaking can be compensated.

Further, the driving mechanism 17 is provided with each of an x-direction position sensor 221 and a y-direction position sensor 227 that are also secured to the body 101 of the binocular. The position sensors may be optical sensors having a light emitting element and a position sensitive device (PSD).

As shown in FIG. 4, the first and second actuators 24 and 29 are controlled by a controller 233 through drivers 222 and 228, respectively. The controller 233 controls the drivers 222 and 228 based on the signals from a vertical hand-held shaking sensor 150 V, a horizontal hand-held shaking sensor 150 H, the x-direction position sensor 221, and the y-direction position sensor 227.

The controller 233 calculates amount of movements of the binocular in the vertical and horizontal directions due to the hand-held shaking, and controls the drivers 222 and 228 to drive the first and second actuators 24 and 29 by an amount corresponding to the amount of movement of the image due to the hand-held shaking. Specifically, the controller 233 determines a target position to which the lens frame 18 is to be positioned for canceling change of the position of the image due to the hand-held shaking based on the amount of movement detected by the hand-held shaking sensors 150 V and 150 H. Then, the controller 233 controls the drivers to move the lens frame 18 to the calculated target position with monitoring of the position being detected by the position sensors 221 and 227. As the above control is continuously executed, the controller 233 continuously updates the target position, and accordingly, trembling of the images due to the hand-held shaking is compensated.

According to the embodiment, the telescopic optical system satisfies condition (1):

$$-0.30 < \phi_c/\phi_{13} < 0, \quad (1)$$

where, $\phi_c$ is a refractive power of the cemented surface of the first and second lenses of the objective optical system, and $\phi_{13}$ is a composite power of the first, second and third lens of the objective optical system.

Condition (1) defines a range of a power of the cemented surface between the first and second lenses L1 and L2 of the objective optical system OL as compared with the power of the objective optical system OL. If condition (1) is satisfied, spherical aberration can be well corrected without increasing the entire size of the objective optical system OL. If the ratio is smaller than the lower limit, the power $\phi_{13}$ of the objective optical system becomes too small to keep compact size or the negative power $\phi_c$ of the cemented surface becomes so large that the spherical aberration is overly corrected. If the ratio is larger than the upper limit, the negative power $\phi_c$ of the cemented surface becomes so small that the spherical aberration cannot be compensated sufficiently.

According to the embodiment, it is preferable that the telescopic optical system further satisfies at least one of conditions (2) and (3):

$$|\phi_{12}/\phi_{13}| < 0.4 \quad (2)$$

$$1.0 < h_i/h_x < 1.4 \quad (3)$$

where, $\phi_{12}$ is a composite power of the first and second lenses of the objective optical system, $\phi_{13}$ is a composite power of the first, second and third lenses of the objective optical system, $h_i$ ($\neq 0$) is a height of a point where a paraxial axial ray intersects the object side surface of the first lens, and $h_x$ is a height of a point where the paraxial axial ray intersects the image side surface of the second lens.

Condition (2) defines a range of a ratio of the composite power of the first and second lenses L1 and L2 with respect to the composite power of the objective optical system OL. The smaller the ratio is, the easier the aberration correction is. That is, if condition (2) is satisfied, aberrations can easily be corrected. If the ratio is larger than the upper limit, a spherical aberration and coma cannot be corrected sufficiently.

Condition (3) defines a range of a ratio of the ray height $h_i$ on the object side surface of the first lens with respect to the ray height $h_x$ on the image side surface of the second lens. If condition (3) is satisfied, aberration is easily corrected. If the ratio is smaller than the lower limit, the first lens L1 should have a negative refractive power, which requires a larger diameter of the second and third lenses L2 and L3. If the ratio is larger than the upper limit, the difference between the ray heights $h_i$ and $h_x$ becomes too large and the spherical aberration and chromatic aberration cannot be compensated sufficiently.

NUMERICAL EMBODIMENTS

Hereafter, numerical embodiments of the telescopic optical systems will be described with reference to FIGS. 5 through 13.

[First Embodiment]

FIG. 5 shows a telescopic optical system according to a first embodiment and the numerical construction thereof is described in TABLE 1. The prisms P1 and P2 of the erecting system PS are shown as plane parallel plates in FIG. 5.

In TABLE 1, r (mm) denotes a radius of curvature of a surface (the values at the vertex for aspherical surfaces), d (mm) denotes a distance between the surfaces along the optical axis, n denotes a refractive index at a wavelength of 588 nm and vd denotes an Abbe number.

TABLE 1

| Surface Number | r | d | n | vd |
|---|---|---|---|---|
| #1 | 59.039 | 4.000 | 1.51633 | 64.1 |
| #2 | −85.520 | 2.000 | 1.60342 | 38.0 |
| #3 | 109.137 | 27.630 | | |
| #4 | 53.307 | 4.000 | 1.49176 | 57.4 |
| #5 | −1056.731 | 20.000 | | |
| #6 | INFINITY | 34.000 | 1.56883 | 56.3 |
| #7 | INFINITY | 2.000 | | |
| #8 | INFINITY | 32.000 | 1.56883 | 56.3 |
| #9 | INFINITY | 5.800 | | |
| #10 | −11.271 | 4.000 | 1.49176 | 57.4 |
| #11 | −27.245 | 13.470 | | |
| #12 | 23.936 | 6.770 | 1.49176 | 57.4 |
| #13 | −10.075 | 0.700 | | |
| #14 | −11.190 | 2.000 | 1.58547 | 29.9 |
| #15 | 25.294 | 0.200 | | |
| #16 | 24.157 | 6.200 | 1.49176 | 57.4 |
| #17 | −15.260 | 0.500 | | |
| #18 | 22.703 | 3.500 | 1.60311 | 60.7 |
| #19 | −75.123 | — | | |

The image side surface #5 of the third lens L3 is an aspherical surface. Further, surfaces #11 and #13 are also aspherical surfaces.

An aspherical surface is expressed by the following equation:

$$X(h) = \frac{h^2 C}{1 + \sqrt{1 - (1+K)h^2 C^2}} + A_4 h^4 + A_6 h^6 + A_8 h^8 + A_{10} h^{10} \ldots$$

where, X(h) is a SAG, that is, a distance of a curve from a tangential plane at a point on the surface where the height from the optical axis is h. C is a curvature (1/r) of the vertex of the surface, K is a conic constant, A4, A6, A8 and A10 are aspherical surface coefficients of fourth, sixth, eighth and tenth orders. The constant K and coefficients A4 and A6 are indicated in TABLE 2. In the embodiments, coefficients A8 and A10 are equal to zero.

TABLE 2

| 5th surface | 11th surface | 13th surface |
|---|---|---|
| K = 0.00000 | K = 0.00000 | K = −1.00000 |
| A4 = 0.54040 × 10⁻⁶ | A4 = −0.17120 × 10⁻³ | A4 = 0.46000 × 10⁻⁵ |
| A6 = 0.00000 | A6 = −0.54020 × 10⁻⁶ | A6 = 0.00000 |

FIGS. 6A through 6D show third order aberrations of the telescopic optical system according to the first embodiment:

FIG. 6A shows spherical aberrations at d-line (588 nm), g-line (436 nm) and c-line (656 nm);

FIG. 6B shows a lateral chromatic aberration at the same wavelengths as in FIG. 6A;

FIG. 6C shows an astigmatism (S: Sagittal, M: Meridional); and

FIG. 6D shows distortion.

The vertical axis in FIG. 6A represents a diameter of an eye ring, and the vertical axes in FIGS. 6B through 6D respectively represent an angle B formed between the exit ray from the eyepiece and the optical axis. unit of the horizontal axis is "mm" in each of FIGS. 6A through 6C, and is "percent" in FIG. 6D.

FIG. 7A is a graph showing the axial coma of the telescopic optical system of the first embodiment when the third lens is not decentered, and FIG. 7B is a graph showing the axial coma where the third lens is decentered to stabilize the image when the tilt angle due to the hand-held shaking is 1 degree. According to the first embodiment, coma can be made smaller, even when the third lens L3 is decentered, than the conventional compensation system using a variable angle prism.

[Second Embodiment]

FIG. 8 shows an optical system according to a second embodiment. The numerical construction of the second embodiment is indicated in TABLE 3.

TABLE 3

| Surface Number | r | d | n | vd |
|---|---|---|---|---|
| #1 | 70.950 | 4.000 | 1.51633 | 64.1 |
| #2 | −68.000 | 2.000 | 1.60342 | 38.0 |
| #3 | 202.339 | 6.220 | | |
| #4 | 120.000 | 4.000 | 1.49176 | 57.4 |
| #5 | −237.774 | 37.000 | | |
| #6 | INFINITY | 34.000 | 1.56883 | 56.3 |
| #7 | INFINITY | 2.000 | | |
| #8 | INFINITY | 32.000 | 1.56883 | 56.3 |
| #9 | INFINITY | 16.000 | | |
| #10 | −680.500 | 4.000 | 1.49176 | 57.4 |
| #11 | 35.849 | 9.230 | | |
| #12 | 23.936 | 6.770 | 1.49176 | 57.4 |
| #13 | −10.075 | 0.700 | | |
| #14 | −11.190 | 2.000 | 1.58547 | 29.9 |

TABLE 3-continued

| Surface Number | r | d | n | vd |
|---|---|---|---|---|
| #15 | 25.294 | 0.200 | | |
| #16 | 24.157 | 6.200 | 1.49176 | 57.4 |
| #17 | −15.260 | 0.500 | | |
| #18 | 22.703 | 3.500 | 1.60311 | 60.7 |
| #19 | −75.123 | — | | |

The image side surface #5 of the third lens L3 is an aspherical surface. Further, the surfaces #11 and #13 are also aspherical surfaces. The constant K and coefficients $A_4$ are indicated in TABLE 4. The coefficients $A_6$, $A_8$ and $A_{10}$ are equal to zero.

TABLE 4

| 5th surface | 11th surface | 13th surface |
|---|---|---|
| K = 0.00000 | K = 0.00000 | K = −1.00000 |
| $A_4$ = 0.22050 × $10^{-6}$ | $A_4$ = −0.17530 × $10^{-3}$ | $A_4$ = −0.46000 × $10^{-5}$ |

FIGS. 9A through 9D show third order aberrations of the telescopic optical system according to the second embodiment.

FIG. 10A is a graph showing the axial coma of the telescopic optical system of the second embodiment when the third lens is not decentered. FIG. 10B is a graph showing the axial coma when the third lens is decentered to stabilize the image when the tilt angle is 1 degree. In the second embodiment, coma can be made smaller, even when the third lens L3 is decentered, than the conventional compensation system using a variable angle prism.

[Third Embodiment]

FIG. 11 shows an optical system according to a third embodiment, and the numerical construction thereof is indicated in TABLE 5.

TABLE 5

| Surface Number | r | d | n | vd |
|---|---|---|---|---|
| #1 | 1520.979 | 2.000 | 1.62004 | 36.3 |
| #2 | 58.481 | 4.500 | 1.51633 | 64.1 |
| #3 | −387.380 | 2.000 | | |
| #4 | 67.614 | 4.000 | 1.49176 | 57.4 |
| #5 | −347.000 | 26.630 | | |
| #6 | INFINITY | 34.000 | 1.56883 | 56.3 |
| #7 | INFINITY | 2.000 | | |
| #8 | INFINITY | 32.000 | 1.56883 | 56.3 |
| #9 | INFINITY | 28.820 | | |
| #10 | 48.800 | 4.000 | 1.49176 | 57.4 |
| #11 | 31.605 | 15.590 | | |
| #12 | 23.936 | 6.770 | 1.49176 | 57.4 |
| #13 | −10.075 | 0.700 | | |
| #14 | −11.190 | 2.000 | 1.58547 | 29.9 |
| #15 | 25.294 | 0.200 | | |

TABLE 5-continued

| Surface Number | r | d | n | vd |
|---|---|---|---|---|
| #16 | 24.157 | 6.200 | 1.49176 | 57.4 |
| #17 | −15.260 | 0.500 | | |
| #18 | 22.703 | 3.500 | 1.60311 | 60.7 |
| #19 | −75.123 | — | | |

The image side surface #5 of the third lens L3 is an aspherical surface. Further, surfaces #11 and #13 are also aspherical surfaces. The constant K and coefficients $A_4$, $A_6$ and $A_8$ are indicated in TABLE 6. The coefficients $A_{10}$ is equal to zero.

TABLE 6

| 5th surface | 11th surface | 13th surface |
|---|---|---|
| K = 0.00000 | K = 0.00000 | K = −1.00000 |
| $A_4$ = 0.21290 × $10^{-6}$ | $A_4$ = 0.36130 × $10^{-4}$ | $A_4$ = −0.46000 × $10^{-5}$ |
| $A_6$ = −0.53870 × $10^{-9}$ | $A_6$ = −0.66150 × $10^{-6}$ | $A_6$ = 0.00000 |
| $A_8$ = 0.45150 × $10^{-11}$ | $A_8$ = 0.00000 | $A_8$ = 0.00000 |

FIGS. 12A through 12D show third order aberrations of the telescopic optical system according to the third embodiment.

FIG. 13A is a graph showing the axial coma of the telescopic optical system of the third embodiment when the third lens is not decentered, and FIG. 13B is a graph showing the axial coma when the third lens is decentered to stabilize the image when the tilt angle is 1 degree. In the third embodiment, coma can be made smaller, even when the third lens L3 is decentered, than the conventional compensation system using a variable angle prism.

TABLE 7 shows the values of the first to third embodiments for conditions (1) to (4).

TABLE 7

| | First Embodiment | Second Embodiment | Third Embodiment |
|---|---|---|---|
| Condition (1) $\phi_c/\phi_{13}$ | −0.09 | −0.14 | −0.21 |
| Condition (2) $\|\phi_{12}/\phi_{13}\|$ | 0.22 | 0.35 | 0.003 |
| Condition (3) $h_i/h_x$ | 1.03 | 1.03 | 1.00 |

TABLE 8

| Embodiment No. | $\phi 2$ | $\phi 1-3$ | $\phi 1-2$ | hi | hx | Condition (1) $\phi 2/\phi 1-3$ | Condition (2) $\|\phi 1-2/\phi 1-3\|$ | Condition (3) hi/hx | Condition (4) $\tan 1^*/(\phi 1-3-\phi 1-2)$ |
|---|---|---|---|---|---|---|---|---|---|
| 1 | −0.0010 | 0.0111 | 0.0024 | 1.0000 | 0.9873 | −0.09 | 0.22 | 1.03 | 2.00 |
| 2 | −0.0013 | 0.0090 | 0.0031 | 1.0000 | 0.9733 | −0.14 | 0.35 | 1.03 | 2.99 |
| 3 | −0.0018 | 0.0087 | −0.00003 | 1.0000 | 1.0035 | −0.21 | 0.003 | 1.00 | 2.01 |

TABLE 9

| Ex. No. | f1 | f2 | f3 | f1-3 | f1-2 |
|---|---|---|---|---|---|
| 1 | 88.288 | −79.154 | 103.317 | 89.935 | 416.197 |
| 2 | 87.913 | −84.111 | 182.775 | 111.588 | 320.851 |
| 3 | −98.141 | 98.746 | 115.439 | 115.385 | −38710.341 | f1: focal length of the first lens
f2: focal length of the second lens
f3: focal length of the third lens
f1-2: composite focal length of the first and second lenses
f1-3: composite focal length of the first, second and third lenses Each of the embodiments satisfies conditions (1), (2) and (3), and is suitable to the telescopic optical system of a binocular having an image-vibration compensation system.

It should be noted that, in the embodiments, the erected images are observed through the eyepiece EP. The invention is not limited to this particular structure, and is applicable to an observing equipment in which imaging devices (e.g., a CCD: a Charge Coupled Device) and an imaging lenses are used in place of, or in association with the eyepiece EP.

Further, in the above embodiments, the image-vibration compensation system is designed for compensating trembling of the image due to both the vertical and horizontal hand-held shakings. However, the system may be designed for compensating the hand-held shaking in one of these two directions according to uses.

The present invention is directed the optical system of an observing equipment that includes hand-held shaking sensors, sensors for detecting the position of the compensation lenses. However, the details of the hand-held shaking sensors and/or position detection sensors do not form part of the invention. These are provided to assist in understanding of the invention, and any types of suitable hand-held shaking sensors and/or position detecting sensors could be employed to control the driving mechanism for the compensation lenses.

What is claimed is:

1. An optical system for an observing equipment having an image-vibration compensation system, said optical system comprising:

an objective optical system for forming an image of an object, said objective optical system including a first lens having positive refractive power, a second lens having negative refractive power and a third lens having positive refractive power, said third lens having at least one aspherical surface, said first, second and third lenses being arranged in that order from an object side, said first and second lenses being cemented to each other, said third lens being movable in a direction orthogonal to an optical axis of said objective optical system;

an erecting system for erecting said image formed by said objective optical system; and an observing optical system for observing the image erected by said erecting system, wherein condition (1) is satisfied:

$$-0.30 < \phi_c/\phi_{13} < 0, \tag{1}$$

where, $\phi_c$ is a refractive power of the cemented surface of said first and second lenses, and $\phi_{13}$ is a composite power of said first, second and third lenses.

2. The optical system according to claim 1, wherein conditions (2) and (3) are satisfied:

$$|\phi_{12}/\phi_{13}| < 0.4 \tag{2}$$

$$1.0 < h_i/h_c < 1.4 \tag{3}$$

where, $\phi_{12}$ is a composite power of said first and second lenses, $h_i$ ($\neq 0$) is a height of a point where a paraxial axial ray intersects an object side surface of said first lens, and $h_x$ is a height of a point where said paraxial axial ray intersects an image side surface of said second lens.

3. The optical system according to claim 1, wherein condition (2) is satisfied:

$$|\phi_{12}/\phi_{13}| < 0.4 \tag{2}$$

where, $\phi_{12}$ is a composite power of said first and second lenses.

4. The optical system according to claim 1, wherein conditions (3) is satisfied:

$$1.0 < h_i/h_x < 1.4 \tag{3}$$

where, $h_i$ ($\neq 0$) is a height of a point where a paraxial axial ray intersects an object side surface of said first lens, and $h_x$ is a height of a point where said paraxial axial ray intersects an image side surface of said second lens.

5. The optical system according to claim 1, wherein said third lens is a plastic lens.

* * * * *